(12) United States Patent
Husson et al.

(10) Patent No.: US 6,273,633 B1
(45) Date of Patent: Aug. 14, 2001

(54) ASSEMBLY NODE

(75) Inventors: Daniel Husson, Kaysersberg; Alain Pontius, Bennwihr, both of (FR)

(73) Assignee: Husson Collectivites S.A. (Societe Anonyme), Lapoutroie (FR)

( * ) Notice: Subject to any disclaimer, the term of this patent is extended or adjusted under 35 U.S.C. 154(b) by 0 days.

(21) Appl. No.: 09/328,442

(22) Filed: Jun. 9, 1999

(30) Foreign Application Priority Data

Jun. 9, 1998 (EP) ................................................. 98440124

(51) Int. Cl.⁷ ....................................................... F16B 7/18
(52) U.S. Cl. .............................................. 403/218; 403/171
(58) Field of Search ............................. 403/49, 170, 171, 403/173, 218, 205, 260, 340

(56) References Cited

U.S. PATENT DOCUMENTS

| | | | |
|---|---|---|---|
| 2,018,539 | * 10/1935 | Welsh | 403/218 |
| 2,715,537 | * 8/1955 | Hofheimer | 403/173 |
| 3,682,504 | * 8/1972 | Brimberg | 403/218 X |
| 4,039,263 | * 8/1977 | Bassler | 403/218 |
| 4,780,018 | * 10/1988 | Godden | 403/173 |
| 4,864,795 | 9/1989 | Burg . | |
| 5,127,759 | * 7/1992 | Orbom | 403/171 |
| 5,372,447 | * 12/1994 | Chung | 403/171 |
| 5,549,408 | * 8/1996 | Lo | 403/218 |

FOREIGN PATENT DOCUMENTS

| | | |
|---|---|---|
| 296 16 635 U | 12/1996 | (DE) . |
| 2 294 532 | 7/1976 | (FR) . |
| 2 694 583 | 2/1994 | (FR) . |
| 1 265 889 | 3/1972 | (GB) . |

* cited by examiner

Primary Examiner—Lynne H. Browne
Assistant Examiner—David E. Bochna
(74) Attorney, Agent, or Firm—Young & Thompson

(57) ABSTRACT

An assembly node for tubular structures in the form of two half-shells (1) joined together by bolts and provided with corresponding recesses (2) and/or holes (3) for the insertion and blocking of the ends of tubular elements (4 and 5). The assembly node is provided, for each end of a tubular element (5) to be mounted in at least one hole (3) of a half-shell (1), outside the joint planes (6), with at least one independent element (10) for holding and gripping the end without play. The assembly is more particularly applicable in the field of tubular structures, in particular tubular constructions, sport and leisure time equipment, as well as scaffolding and exhibition materials.

2 Claims, 3 Drawing Sheets

ASSEMBLY NODE

FIELD OF THE INVENTION

The present invention relates to the field of tubular structures, in particular tubular constructions, equipment for sport and leisure time, as well as scaffolding and exhibition materials and has for its object an assembly node for such structures.

BACKGROUND OF THE INVENTION

At present, the assembly of tubular structures at their nodes is generally carried out by means of two-part collars, gripping the tubes at the level of the node by means of bolts passing through the collars.

There can also be provided a direct mounting between two tubes at a node, by means of a bolt or other assembly elements with gripping by screwing the assembly by means of pressure screws.

Moreover, there is known in the field of exhibition materials, particularly stages, assembly devices in the form of balls having a certain number of blind holes that can each co-act with a tube or the like, said balls being simply placed over the ends of the tubes.

These different assembly devices of known nodes however have a certain number of drawbacks, namely, in the case of collars, permitting the production of nodes having only a reduced number of tubes and, in the case of the use of balls or the like, not permitting securing the ends of the tubes in said balls. Moreover, the provision of collars does not permit obtaining an appearance compatible for example with the production of certain structures, in particular in the field of leisure time or store equipment.

There is also known, from FR-A-2 694 583, an assembly node for tubular structures in the form of two half-shells assembled together by bolting and provided with corresponding recesses and/or holes for the insertion and the blockage of ends of tubular elements. This node assembly permits assembling, on the one hand, the ends of several tubular elements by means of half-shells, the gripping means between the shells serving simultaneously for blocking said ends at the corresponding recesses and, on the other hand, the mounting of the end of other tubular elements perpendicularly to the plane of the first and maintained in position with specific means therefor.

However, this embodiment does not permit obtaining a grip without play of the tubular elements mounted perpendicularly or in another oblique plane relative to the junction plane of the half-shells, such that there remains the possibility of rotation or pivoting relative to the longitudinal axis of said tubular elements.

SUMMARY OF THE INVENTION

The present invention has for its object to overcome these drawbacks by providing an assembly node for tubular elements permitting blocking without play the ends of the elements located outside the joint plane of the half-shells constituting said assembly node.

It thus has for its object an assembly node for tubular structures, which is in the form of two half-shells assembled together by bolting and provided with corresponding recesses and/or holes for the insertion and blocking of the ends of tubular elements, characterized in that it is provided, for each end of a tubular element to be mounted in at least one hole of a half-shell, outside the joint planes, at least one independent means for holding and gripping said end without play.

BRIEF DESCRIPTION OF THE INVENTION

The invention will be better understood from the following description, which relates to a preferred embodiment, given by way of non-limiting example, and explained with reference to the accompanying schematic drawings, in which.

Figure 1:
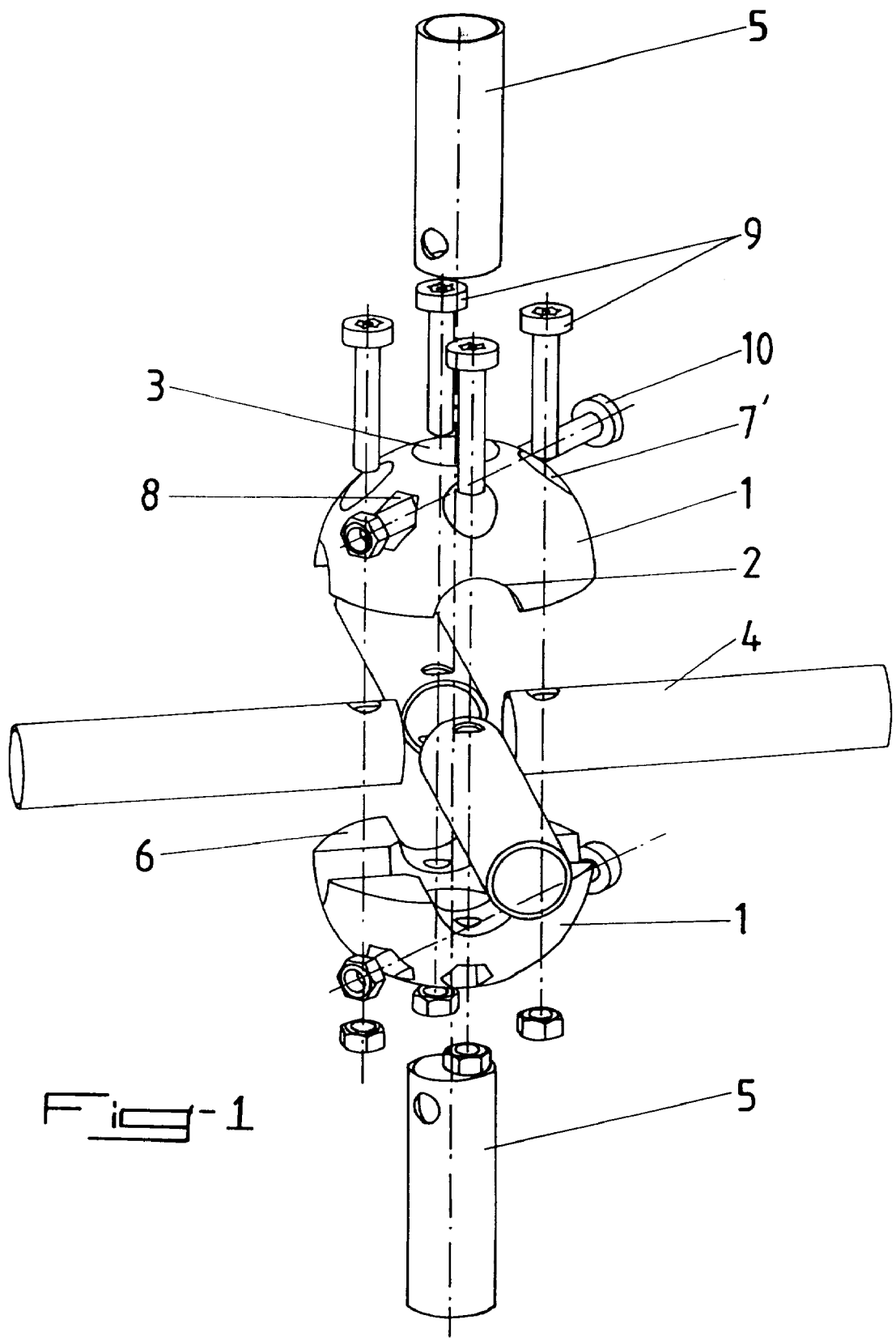
FIG. 1 is an exploded perspective view of a node according to the invention.
Figure 2:
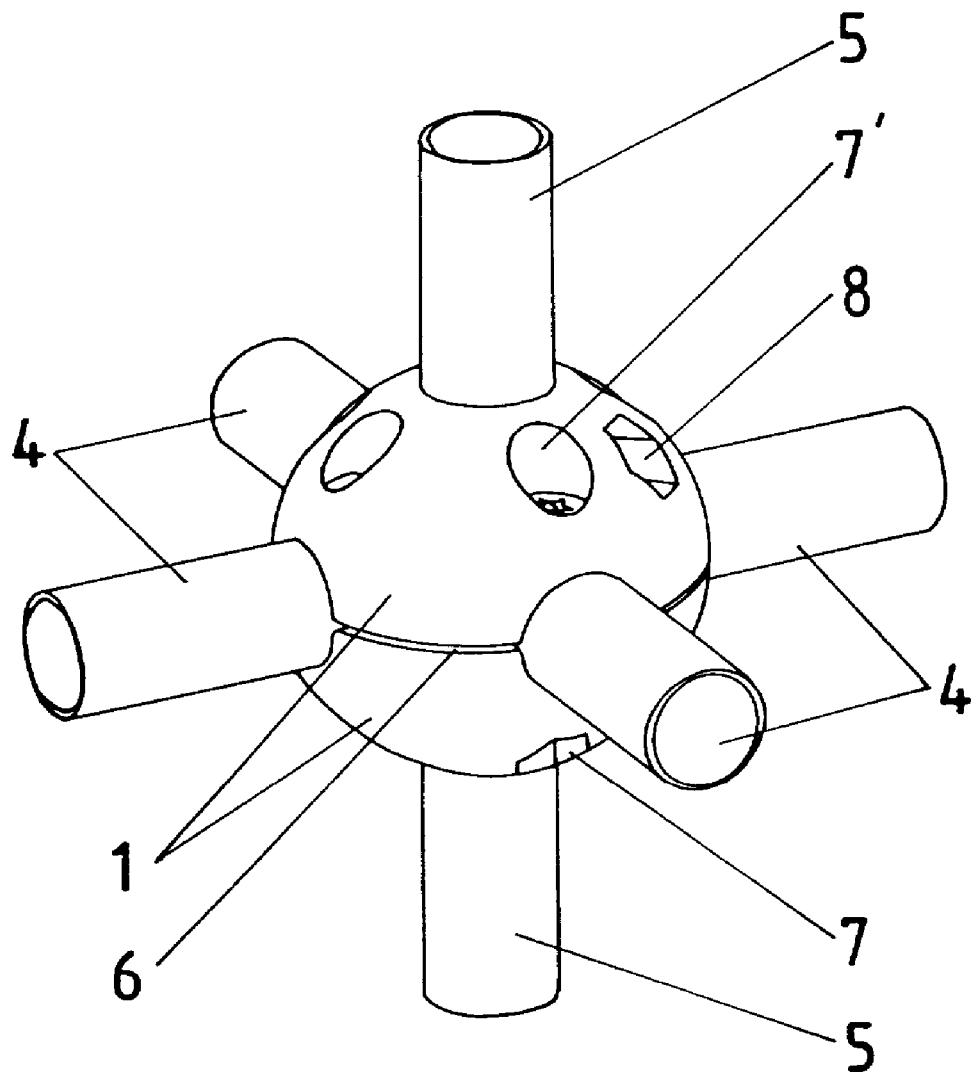
FIG. 2 is a perspective view of the node in service position.

FIGS. 1 and 2 of the accompanying drawings show, by way of example, an assembly node for tubular structures, present in the form of two half-shells 1 assembled together by bolts and provided with recesses 2 and holes 3 for the insertion and blocking of the ends of tubular elements 4 and 5. To this end, the half-shells 1 are provided each on its joint plane 6, with recesses 2 disposed symmetrically relative to the joint planes 6 as well as holes 3 extending in one or several different planes from the joint planes 6 (FIGS. 1 to 3).

These half-shells 1 are preferably provided, perpendicularly to the axis of the recesses 2 and to the joint planes 6 and perpendicularly to the axis of the holes 3, with respective passage holes 7, 7' and 8, 8' for corresponding gripping means 9 and 10 which co-act with transverse holes provided in the corresponding ends of the tubular elements 4 and 5 to be mounted and locked in the half-shells 1. These holes have a diameter at least equal to that of the axles of the corresponding gripping means 9 and 10.

Figure 3:
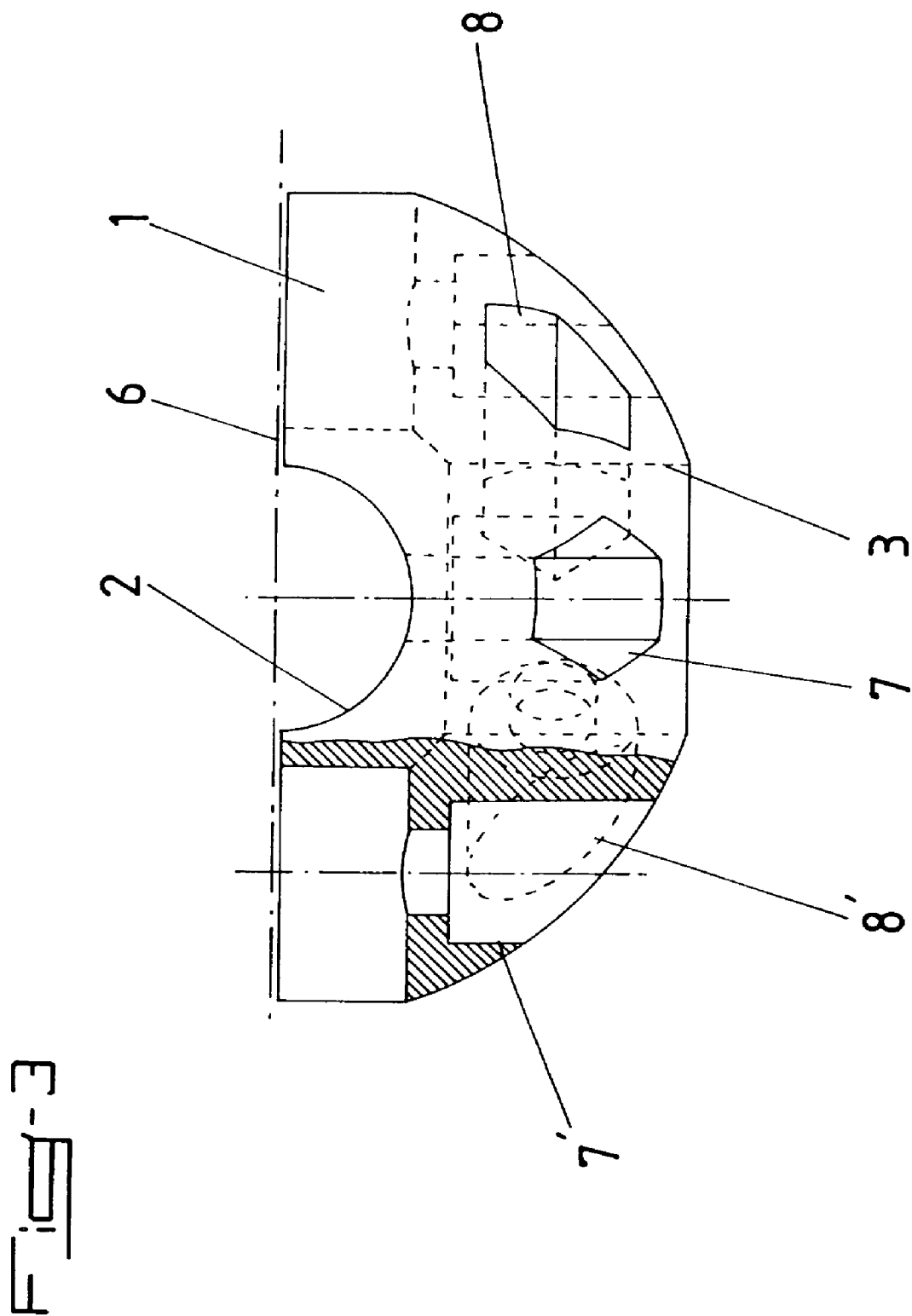
FIG. 3 is a side elevational view, partially in cross-section, of a half-shell.

According to the invention and as shown more particularly in FIGS. 1 and 3 of the accompanying drawings, the assembly node is provided, for each end of a tubular element 5 to be mounted in at least one hole 3 of a half-shell, outside the joint planes 6, with at least one independent means 10 for holding and gripping said end without play.

The elements of the gripping means 9 are disposed in respective passage holes 7 and 7' of corresponding shape. A series of these holes, 7, permits, in a known manner, a shape mating with one of the elements of the gripping means, namely, for example, a hexagonal nut, the other element, namely for example a screw with a cylindrical head with six hollow sides, being disposed freely in a corresponding shouldered passage hole 7'.

According to one characteristic of the invention, the independent means 10 for holding and gripping without play is preferably constituted by a bolt, of which the nut, preferably hexagonal, is guided shape-matingly in a passage hole 8 of the half-shell 1 extending from the exterior of the latter to the hole 3 for reception of the end of the corresponding tubular element 5, the screw, in the form of a screw with a cylindrical head with six flat sides, being disposed freely in a shouldered passage hole 8' opposite the hole 8 for guiding the nut.

Thus, during gripping of an independent means 10 for holding and gripping without play by actuating its screw passing through the end of the tubular element 5, this latter draws the corresponding nut toward the corresponding surface of the element 5 and grips it against this latter. Because of the bearing of the screw head on the shoulder provided in the passage hole 8', the gripping of the nut against the element 5 has the effect of integrally suppressing the mounting play that could exist in the hole 3 and thus any risk of pivoting or rotation of said element 5 relative to its longitudinal axis.

Thus it is possible to provide an assembly of the ends of several tubular elements by means of half-shells 1, the gripping means for the half-shells 1 together serving simultaneously for blocking said ends at the level of the recesses 2, whilst the end of the tubular elements enters the holes 3 and are maintained in position in these latter by the independent means 10 for holding and gripping without play passing through the corresponding hole of the end of said tubular elements 5 and whose constituent elements are disposed in the holes 8 and 8'.

In the accompanying drawings, the half-shells 1 preferably have a hemispherical shape. Thus, it is possible to provide an assembly node having, on the one hand, possibilities of securement of tubular elements in the plane of the joint and, on the other hand, possibilities of securement of such tubular elements in one or several secant planes, the assembly and blocking means being entirely embedded in the half-shells. However, half-shells of different shape are also to be envisaged.

Thanks to the invention, it is possible to provide an assembly node emitting a larger number of varieties of assembly and in which each tubular element co-acting with the node is secured to the latter without any play. Moreover, the assembly node according to the invention has an appearance which is very greatly improved relative to the devices now existing, such that it can be used without complementary decoration, directly in the production of equipment for leisure time or the like, or as assembly elements of tubular structures used in the sale of magazines, in particular stands.

Such an assembly node can be made of any rigid material compatible with the structure to be formed.

Of course, the invention is not limited to the embodiment described and shown in the accompanying drawings. Modifications remain possible, particularly as to the construction of various elements or by substitution of technical equivalents, without thereby departing from the scope of protection of the invention.

What is claimed is:

1. In an assembly node for tubular structures comprising two half-shells joined together along respective joint planes by bolts and provided with corresponding recesses and insertion holes for receiving and blocking ends of tubular elements, the improvement wherein the assembly node is provided, for each end of a tubular element to be mounted in at least one insertion hole of a half-shell, outside the joint planes, with at least one independent means for holding and gripping said end without play; said independent means for holding and gripping the end without play comprising a bolt having a nut guided shape-matingly in a passage hole in the half-shell extending from the exterior of said half-shell to the insertion hole, which in use receives the end of the corresponding tubular element, a screw being disposed freely in a shouldered passage hole opposite to the passage hole for guiding the nut, said screw passing through a corresponding hole at the end of the tubular element and drawing the nut toward an outer surface of the tubular element thereby gripping said nut against said outer surface.

2. The assembly node according to claim 1, wherein the nut is hexagonal, and the screw is in the form of a cylindrical head screw having six inner flat sides.

* * * * *